(12) United States Patent
Dozier et al.

(10) Patent No.: US 7,624,959 B2
(45) Date of Patent: *Dec. 1, 2009

(54) MOUNTING DEVICE FOR A FLAT SCREEN DISPLAY PANEL

(75) Inventors: Leonard Dozier, Yorba Linda, CA (US); Michael F. Bouissiere, Yorba Linda, CA (US)

(73) Assignee: Premier Mounts, Anaheim, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 11/187,570

(22) Filed: Jul. 22, 2005

(65) Prior Publication Data

US 2005/0253035 A1 Nov. 17, 2005

Related U.S. Application Data

(63) Continuation-in-part of application No. 10/134,567, filed on Apr. 26, 2002, now Pat. No. 6,923,413.

(51) Int. Cl.
*E04G 3/00* (2006.01)
(52) U.S. Cl. .............................. 248/294.1; 248/222.14; 248/284.1; 248/291.1; 248/917
(58) Field of Classification Search .............. 248/294.1, 248/284.1, 274.1, 279.1, 278.1, 917, 276.1, 248/291.1, 22.14, 227.14; D8/373
See application file for complete search history.

(56) References Cited

U.S. PATENT DOCUMENTS

| | | | |
|---|---|---|---|
| 2,569,622 A | 10/1951 | Trainor | |
| 3,567,170 A | 3/1971 | Albee et al. | |
| 3,759,297 A | 9/1973 | Anderson et al. | |
| 3,838,842 A | 10/1974 | McCracken | |
| 4,602,855 A | 7/1986 | Frey | |
| 4,880,196 A | 11/1989 | Eichenlaub | |
| 5,086,916 A | 2/1992 | Gray | |
| 5,537,290 A | 7/1996 | Brown et al. | |
| 5,730,406 A | 3/1998 | Chen | |
| 5,779,206 A | 7/1998 | Harris et al. | |
| 5,876,008 A | 3/1999 | Sweere et al. | |
| 5,918,841 A | 7/1999 | Sweere et al. | |
| 5,923,528 A | 7/1999 | Lee | |
| 5,924,665 A | 7/1999 | Sweere et al. | |
| 6,015,120 A | 1/2000 | Sweere et al. | |
| 6,021,720 A | 2/2000 | Boos et al. | |
| 6,098,952 A | 8/2000 | Tonn | |
| 6,102,348 A | 8/2000 | O'Neill | |
| 6,208,505 B1 | 3/2001 | Kuchta et al. | |
| 6,293,026 B1 | 9/2001 | Lee et al. | |
| 6,430,946 B2 | 8/2002 | Roh et al. | |
| 6,554,242 B2 | 4/2003 | Kim | |
| 6,559,829 B1 * | 5/2003 | Matsuo et al. | 345/156 |
| 6,585,203 B1 | 7/2003 | Euker | |
| 6,604,722 B1 | 8/2003 | Tan | |
| 6,609,693 B2 | 8/2003 | Hui | |
| D493,800 S | 8/2004 | Pfister | |
| D497,537 S | 10/2004 | O'Keene | |

(Continued)

*Primary Examiner*—Amy J. Sterling
*Assistant Examiner*—Tan Le
(74) *Attorney, Agent, or Firm*—Altera Law Group, LLC

(57) ABSTRACT

A mount and methods for attaching a flat screen display panel is disclosed in which a wall bracket is attached to a support surface, a panel bracket is secured to a display panel, and the two brackets then cooperate to securely affix the display panel to the support surface while allowing subsequent lateral and pivotal adjustment.

9 Claims, 14 Drawing Sheets

U.S. PATENT DOCUMENTS

| | | |
|---|---|---|
| 6,886,701 B2 | 5/2005 | Hong |
| 6,905,101 B1 * | 6/2005 | Dittmer .................... 248/274.1 |
| 6,923,413 B2 * | 8/2005 | Dozier .................... 248/294.1 |
| 7,070,156 B2 * | 7/2006 | Liao ........................... 248/466 |
| 7,097,143 B2 | 8/2006 | Kim |
| D528,901 S * | 9/2006 | David ......................... D8/373 |
| D530,595 S * | 10/2006 | Lam et al. .................... D8/373 |
| D538,140 S * | 3/2007 | Ly Hau et al. ............... D8/373 |
| 7,318,572 B2 * | 1/2008 | Dozier .................... 248/294.1 |
| 2001/0035921 A1 | 11/2001 | Yamanami |
| 2002/0033436 A1 * | 3/2002 | Peng et al. ............... 248/284.1 |
| 2004/0232298 A1 * | 11/2004 | Bremmon et al. ...... 248/281.11 |

\* cited by examiner

MOUNTING DEVICE FOR A FLAT SCREEN DISPLAY PANEL

CROSS-REFERENCES TO RELATED APPLICATIONS

This application is a continuation in part of application Ser. No. 10/134,567, filed on 26 Apr. 2002 now U.S. Pat. No. 6,923,413.

BACKGROUND OF THE INVENTION

1. Field of the Invention

The present invention relates generally to a mounting device for a flat screen display panel. More specifically, a mounting device for a flat screen display panel that allows the display screen to be adjusted both laterally and pivotally subsequent to mounting is disclosed.

2. Description of the Related Art

Flat screen displays, such as plasma televisions, thin film transistor ("TFT") displays and the like, are progressively gaining popularity throughout the marketplace. As a result, they are regularly showing up in a wide variety of viewing areas ranging from boardrooms to family rooms.

This recent proliferation has resulted in many different mounts and mounting techniques. There are several different ways to mount a flat panel display including hanging ceiling supports, floor stands, and wall mounts. Current flat panel displays can be quite heavy, with the weight increasing as the display size increases.

Many traditional mounts require an installer to first affix the mount to a supporting surface and then subsequently position the heavy display and align the mounting hardware. This can be a difficult task appreciating the weight involved in many of today's flat panel displays.

An alternative method requires an installer to first secure the mounting hardware to a support surface and then heft and align the display with the previously installed hardware. This method requires at least two installers to hold the display and simultaneously align the mounting hardware and secure the display to the mount.

In addition to weight, an additional drawback results from the fact that today's flat panel display devices are not consistent in their location of mounting holes or mounting hardware, and thus, a plurality of different mounting devices are required to conform to the individual panel to be mounted.

The ability to adjust the orientation of a display panel mounted on a wall is a desirable feature for consumers and installers of a display panel. An example of an apparatus permitting lateral (or horizontal) adjustments of a mounted display panel is disclosed in U.S. Pat. No. 6,585,203 entitled "Flat Panel Display Exterior Rack Mount" to Euker. The patent discloses a mount with relatively few moving parts: a single supporting rod, a display panel mounting bracket with a hole sized for the supporting rod, and two side brackets that mount to the wall and the hold the single support rod. The single supporting rod fits through the display mounting bracket and above the display panel to support the entire weight of the display pane in a free floating vertical orientation. The display panel under the single support rod moves laterally for horizontal adjustment.

The apparatus shown in Euker has a few problems. One problem is that the upper portion of the mounted display screen cannot be tilted downward, and is restricted to the free floating vertical orientation. Another problem is that the display screen merely allows the bottom portion of the display screen to swing toward or away from the wall with no locking ability to fix the orientation. These problems limit the usefulness of the apparatus for vertical angle adjustments.

Another example of an adjustable mounting apparatus is disclosed in U.S. Pat. No. 6,102,348 entitled "Appliance Mounting Device" to O'Neil. The mounting apparatus allows some lateral and some vertical adjustments to be made to a mounted display panel. The patent discloses an apparatus with several components, especially more moving parts such as multiple movable arms and springs biasing the frame and as vertical pivotable connectors.

The O'Neal mounting apparatus has at least two problems. One problem is that as the number of moving parts and overall parts increases, the installation time for the mounting apparatus generally requires more time. In addition, as the number of moving parts increases, the opportunity for a break down generally increases too. See FIGS. 1-9 of O'Neal. Another problem is that the apparatus shown in O'Neal sacrifices its ability to remain close to the wall throughout lateral adjustment of the mounted display panel by using outward arms to shift the frame attached to the panel display. When the mounting display panel moves from the center parallel orientation shown in FIG. 1 of O'Neal toward either side, it is necessarily farther from the wall in various orientation along its lateral range of movement.

There is a need for an adjustable mounting apparatus that addresses the problems described in the background.

BRIEF SUMMARY OF THE INVENTION

The preferred embodiments of the present invention provide a mounting device for a flat screen display panel that can easily be handled by a single installer and can conform to a plurality of mounting configurations corresponding to different display panels. According to one embodiment, a first mounting plate is secured to a support surface, such as a wall. A first mounting arm is secured to a display panel, and has a pivotally attached hook configured to engage the first mounting plate. The mounting arm then engages the mounting plate and the display panels weight is thereby supported by the mounting plate and mounting arm. The mounting plate and mounting arm cooperate to enable lateral horizontal adjustment of the display panel after it is secured in its vertical position, and the pivoting nature of the mounting arm allows the display panel to be adjusted in a pivotal direction about a horizontal axis.

According to another embodiment, a plurality of mounting plates are mounted to a support surface. In one embodiment, a pair of mounting plates are provided, and are disposed vertically from one another. A pair of mounting arms are secured to a display panel, each mounting arm having a pivotally attached hook portion configured to engage a mounting plate.

The hook portions of the mounting arms are engaged with the upper mounting plate, and a resting portion of each mounting arm is engaged with the lower mounting plate. The pivotal nature of the hook portions allows the display panel to be pivotally adjusted about a horizontal axis. Furthermore, the hook portions and resting portions allow the display panel to be adjusted to a desired horizontal position by sliding the hook portions and resting portions laterally with respect to the mounting plates.

A friction increasing device may be provided to increase the frictional contact between the hook portion and the mounting arms to maintain the desired angular orientation of the hook portion relative to the mounting arms thereby maintaining the display panel in a desired viewing orientation.

In accordance with another embodiment of the present invention, a method is provided for mounting a display panel comprising attaching a first mounting plate to a support surface, attaching a second mounting plate to a support surface below the first mounting plate. A first and second brace are attached to a display panel and are spaced laterally from one another. The braces are then lowered onto the first and second mounting plates thereby engaging the braces with each one of the first and second mounting plates. The braces may subsequently be locked onto the mounting plates. The display panel may be adjusted laterally along the mounting plates, and the display panel may be pivotally adjusted about a horizontal axis.

Further features and advantages of the present invention will become apparent to those of skill in the art in view of the detailed description of preferred embodiments which follows, when considered together with the attached drawings and claims.

DETAILED DESCRIPTION OF THE PREFERRED EMBODIMENT

Figure 1:
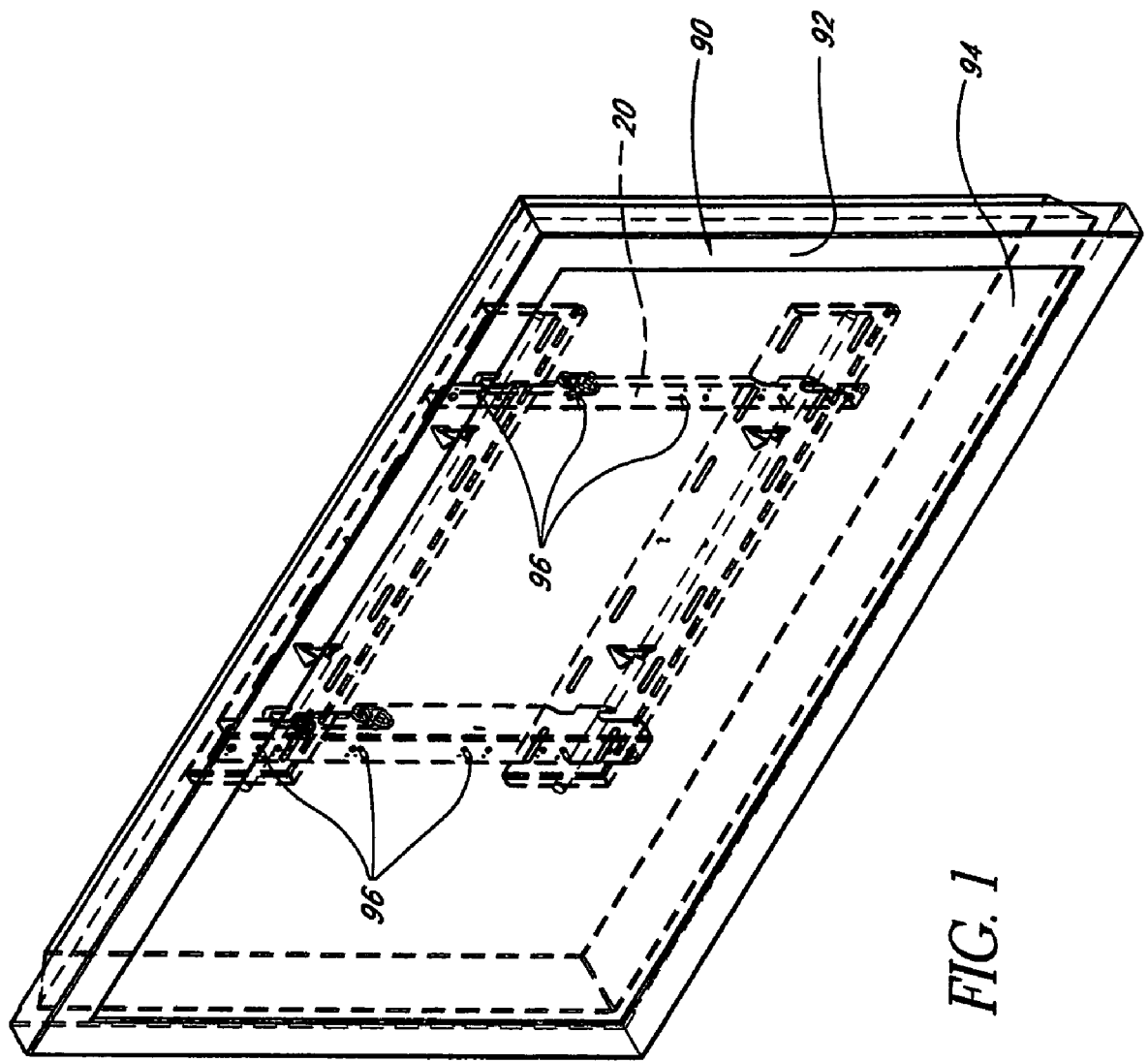
FIG. 1 is an isometric view of an exemplary display panel showing one embodiment of a display panel mount in phantom.
Figure 12:
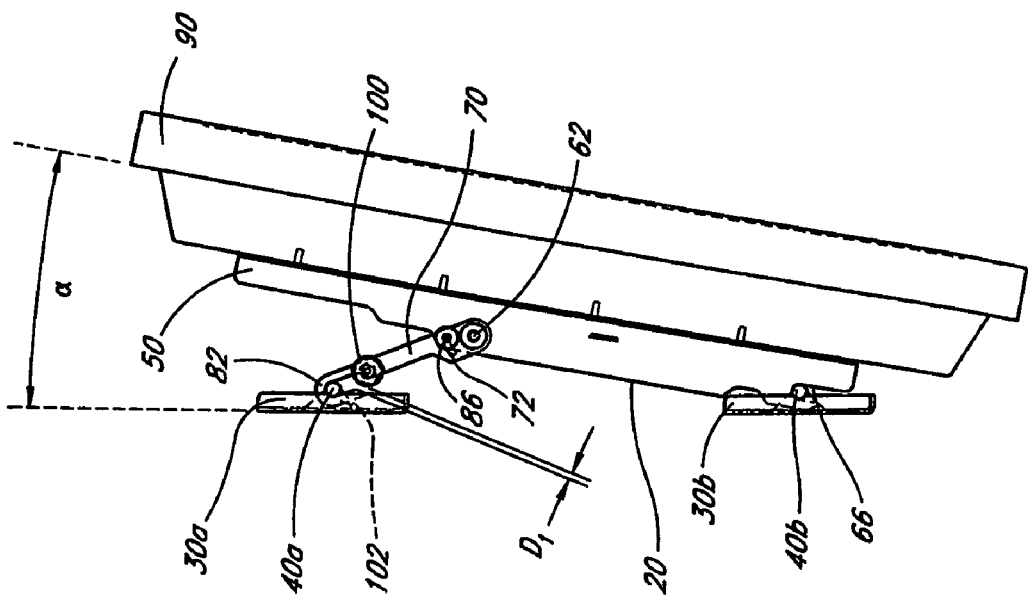
FIG. 12 is a side elevational view of a display mount with attached display according to one embodiment of the present invention showing the display panel maximally angled downward.
Figure 11:
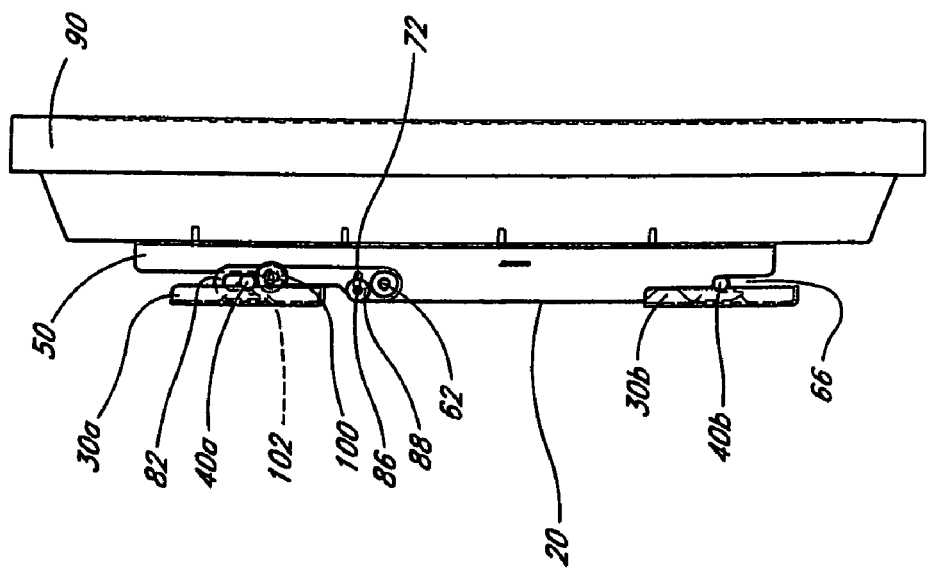
FIG. 11 is a side elevational view of a display mount with attached display according to one embodiment of the present invention showing a minimally pivoted orientation.

Referring to FIGS. 1, 11, and 12 there is shown one embodiment of a wall mounting device 20 of the present invention for use in conjunction with the flat screen display panel 90. It should be noted that the term "wall" as used herein encompasses any substantially vertical surface suitable for mounting a display panel thereon, and should not limit the term to its common meaning.

The embodiments described below enable low-profile mounting devices for the panel display 90 that are easy to use and greatly facilitate mounting of the panel display to the desired wall position.

Figure 2A:
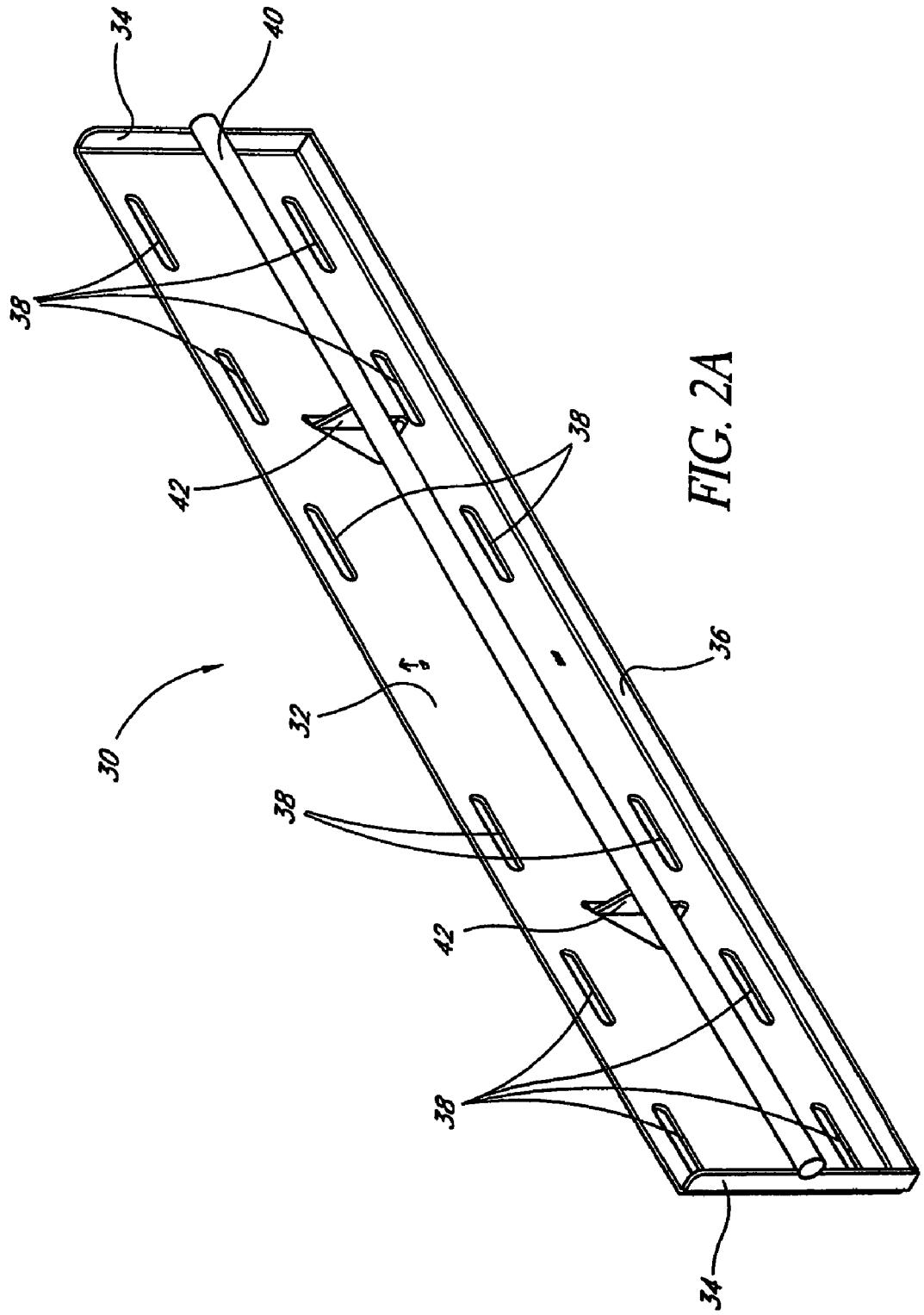
FIG. 2(a) illustrates an isometric view of one embodiment of a wall bracket for use with the mounting device disclosed herein.
Figure 2B:
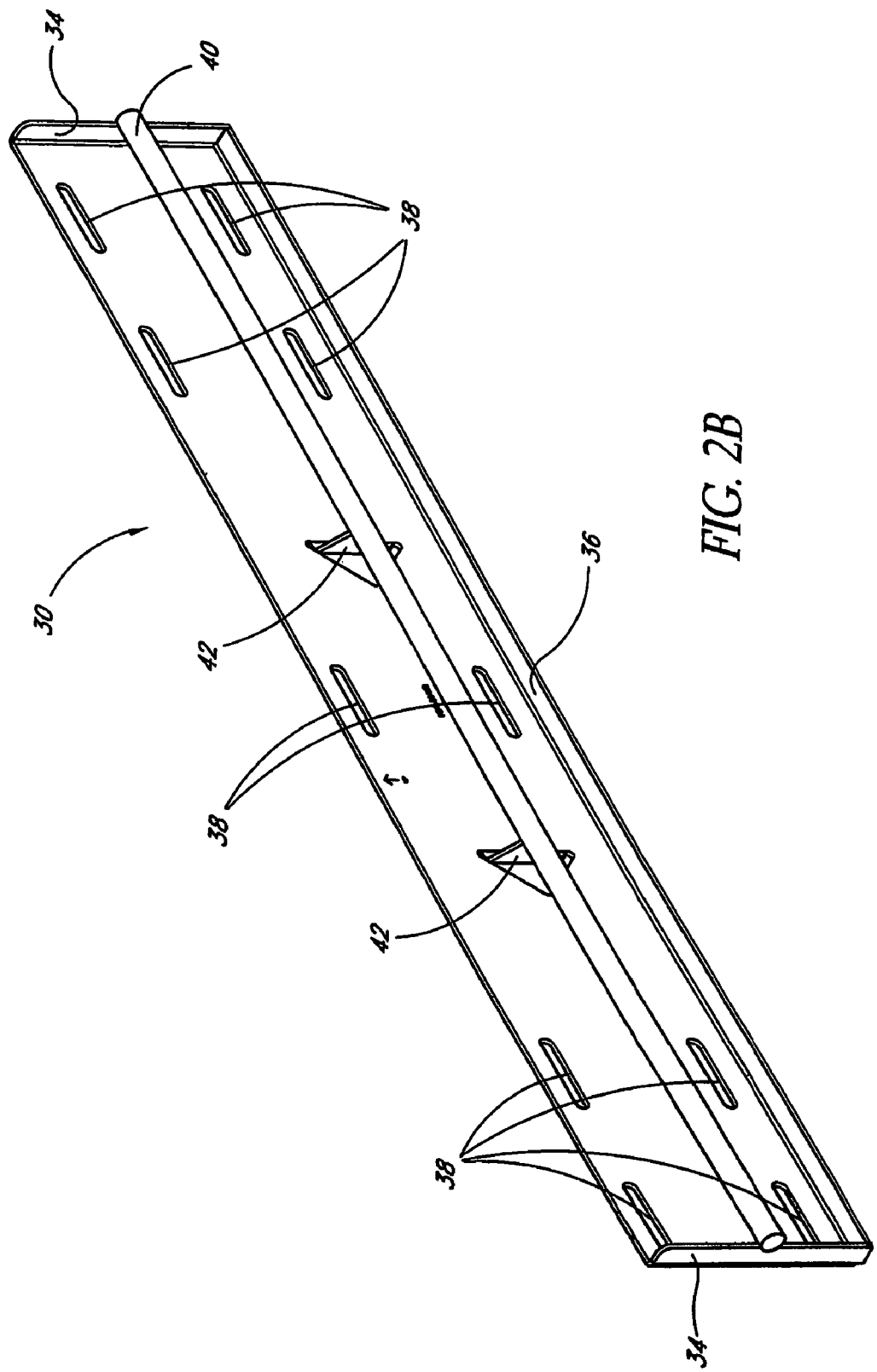
FIG. 2(b) illustrates an isometric view of another embodiment of a wall bracket.

FIGS. 2a-2e show different embodiments of a wall bracket 30. Although a single such bracket is shown in FIGS. 2a-2b, pairs of such wall brackets 30 are advantageously used to securely hold a display panel. For example, see FIG. 1, an isometric view of an exemplary display panel showing one embodiment of a display panel mount in phantom. FIG. 1 shows in phantom a pair of wall brackets (or mounting plates) as an upper wall bracket and a lower bracket. Each member of this pair of mounting plates is disposed vertically from one another. Two support braces are also shown in phantom.

As shown in FIGS. 2a-2b, an individual wall bracket 30 generally has a mounting surface 32 for contacting the desired surface for mounting the display panel. The mounting surface 32 is preferably bounded on two opposing lateral sides and a lower side to provide rigidity to resist torsion and bending stresses. Consequently, lateral flanges 34 and lower flange 36 bound the mounting surface 32 on both lateral sides and a lower side, respectively. The extending dimension of each flange 34 away from the mounting surface 32 is not critical, although it affects the distance the display panel ultimately rests from the wall, and thus, is generally advantageously minimized to allow the display panel to rest close to the wall. The flanges 34 may be integrally formed from the mounting surface 32, such as by bending, or may be separate pieces attached to the mounting surface 32, such as by welding or adhesives.

As further shown in FIGS. 2a-2b, the mounting surface 32 additionally has mounting grooves 38, or optionally, mounting holes, formed therein for receiving suitable fasteners for mounting the wall bracket 30 to a wall. Suitable fasteners include appropriate bolts, wood screws, hollow wall anchors, and the like. The type and quantity of fasteners chosen are selected based upon the size and weight of the display panel to be mounted. Hence, stronger or more numerous fasteners are advantageously used for a heavy display panel, while fewer or less robust fasteners are used for a smaller and lighter display panel.

It is preferable that grooves 38 are wide enough to accept a plurality of different type of fasteners to give the installer a wide latitude in selection of fasteners. Hence, the mounting grooves 38 advantageously have a width within the range of from about 0.25 inches to about 0.75 inches, and in one exemplary embodiment, have a width of about 0.375 inches.

The mounting grooves 38 are also advantageously formed to have a length sufficient for allowing subsequent lateral positioning of the wall bracket 30 once it is loosely secured to a wall and before the fasteners are completely tightened. Depending upon the desired latitude of movement, the grooves 38 may be short, e.g., 1 inch or substantially longer, e.g., 3 inches. However, shorter, e.g., 0.5 inch or longer, e.g., 5 inches, may also be used. In one exemplary embodiment, the groove's length is 2 inches. Moreover, the grooves 38 are strategically located to allow an installer to drive the mounting fasteners into wall studs that are generally placed on either 16 inch or 24 inch centers.

Thus, the wall bracket 30 offers an installer the flexibility of choosing suitable fasteners, and the exact location of installation or fastener placement is not dictated by the characteristics of the wall mount, but by the installer. It is this flexibility in mounting and subsequent adjustment that gives the installer of the flat panel display mount of the present invention the ability to secure the mount in a desired location taking into account to the structure of the wall and subsequently adjust the wall mount to a desired final mounted location.

The wall bracket 30 is further provided with a mounting rod 40 that is displaced away from the surface of the mounting surface 32 to accommodate a retaining hook (not shown). The rod 40 may be of any suitable diameter; but in one exemplary embodiment, is 0.5 inches. The rod is secured to the wall bracket 30 at two or more locations to provide adequate support of the rod 40. These securing locations may be provided by the opposing lateral flanges 34, or may depend directly from the mounting surface 32, or may be a combination thereof. In one embodiment, the rod 40 is secured to semi-circular cutouts in the lateral flanges 34 dimensioned to correspond to the periphery of the rod 40, and by supports 42 attached directly to the mounting surface 32.

Preferably, a plurality of supports 42 are formed in the mounting surface 32 by lancing two sides of a triangular cutout, and then bending along the remaining side to form a protruding support 42 that lies in a generally vertical plane to provide vertical support to the rod 40. Of course, the supports 42 could be configured in any shape and need not be integrally attached to the mounting surface 32, but could alternatively be welded, or otherwise secured into place.

The depicted wall bracket 30 may be formed from a suitable sheet metal, such as steel. However, the components described herein may be manufactured out of alternative materials such as other types of metals, plastics, or composites without detracting from the wall bracket's functionality. The sheet metal construction techniques result in a wall bracket that is fanned from substantially a single piece of material by bending and subsequently welding the rod 40 into place. In one embodiment, the mounting surface 32, lateral flanges 34, lower flange 36, and protruding supports 42 are all integrally formed from a single sheet of material that is stamped, folded, and welded to form the final shape. The wall bracket may subsequently be finished by sanding, polishing, painting, and the like.

Figures 2C, 2D:
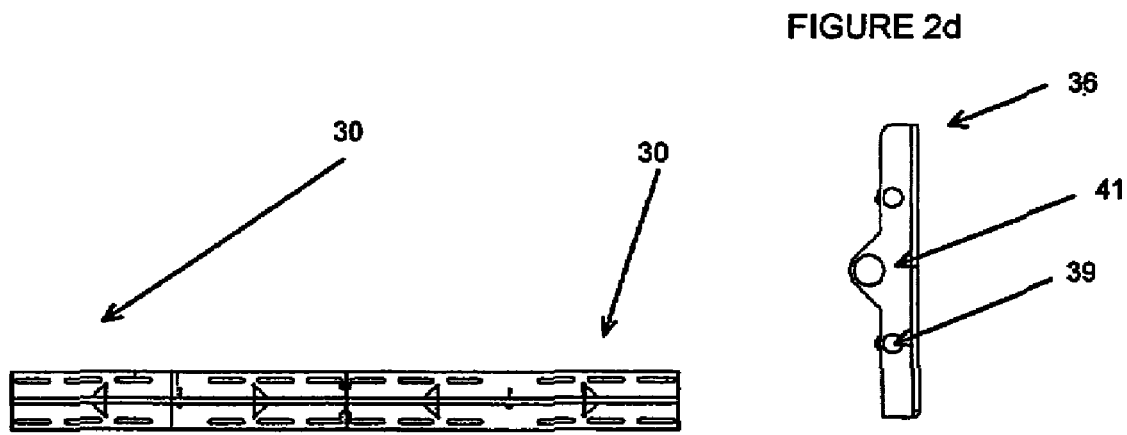
FIG. 2(c) illustrates a top plan view of another embodiment of a wall bracket with two panels affixed together to create a longer panel.
FIG. 2(d) illustrates an end view of the embodiment of the wall bracket shown in FIG. 2(c).
Figure 2E:
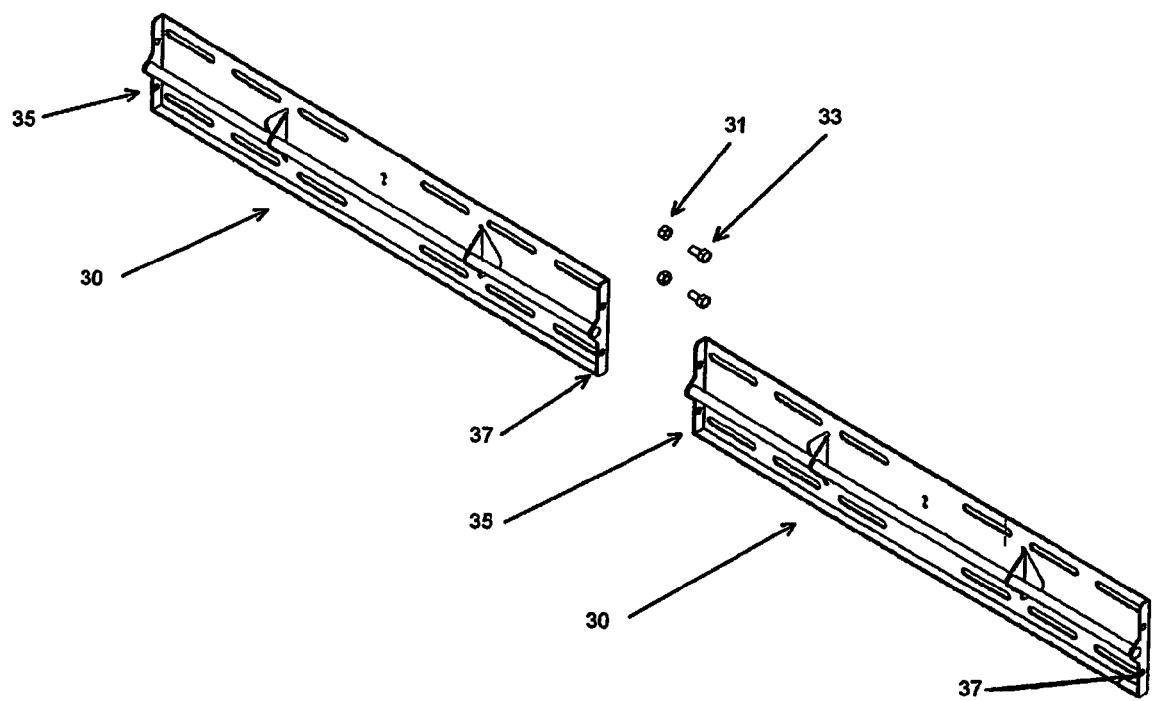
FIG. 2(e) illustrates a perspective view of another embodiment of a wall bracket with two separate panels and bolts used to connect the panels.

Pair of Horizontaly Placed Wall Brackets (Mounting Plates) Affixed Together or Separate from Each Other FIGS. 2c and 2e show a pair of wall brackets 30. FIG. 2c shows a pair of horizontally (or laterally) placed wall brackets 30 that are affixed to each other. The horizontally placed wall brackets 30 when joined together form a longer wall bracket that can be used to mount display screens that are wider than typical display screen (not shown). FIG. 2d shows a lateral flange 36 used on the ends of the wall brackets that permits connecting one or more wall brackets together.

FIG. 2e shows two separate wall bracket 30 that are not yet affixed to each other, and a nut 31 and bolt 33 that can be used to affix the two separate wall brackets 30 together at their respective first end 35 and second end 37 pieces. While two bolts and screws are shown in this embodiment, any fastener that securely connects or affixes the wall brackets together is suitable.

It is preferable, as previously described with respect to the single wall brackets, that a pair of horizontally placed wall brackets 30 is disposed vertically from another pair of horizontally placed wall brackets 30 (not shown).

In another embodiment (not shown), the pair of horizontally placed wall brackets are not affixed together. In this embodiment, the wall brackets or mounting plates are laterally spaced apart from each other (a gap between the plates), and are in the same plane. The use of separate wall brackets spaced apart horizontally provides an installer with more flexibility in adjusting to the width of a display screen. It is preferable that a pair of horizontally spaced apart wall brackets 30 is disposed vertically from one another pair of horizontally spaced apart wall brackets 30 (not shown).

FIG. 2d shows an end view of a lateral flange 34 having two holes 39 vertically displaced around a central point 41. While only one end is shown in FIG. 2d, it is preferable that each end of the wall bracket has lateral flanges that permit a connection. In this manner, an installer can link 2, 3, 4, and more wall brackets together to accommodate wider screen display panels. In addition, the installer can mount a line of 2 or more wall brackets at a predetermined height so that a single display screen can be moved laterally and affixed at a different location along a wall. The installer can space the wall brackets apart for greater width without more wall brackets or the wall brackets can be affixed to each other. This technique can also be used to mount more than one display panel on the wall at the same predetermined height.

While FIG. 2d shows a lateral flange having two screw holes, the lateral flange can have slots instead of holes (not shown). The lateral flange can have a single hole or slot, or a plurality of holes. The purpose of a hole or a slot is to join or connect the wall brackets so any number of suitable embodiments are permissible for affixing the wall brackets.

The flexibility of horizontally (or laterally) linking wall brackets together or horizontally spacing wall brackets is a significant benefit for an installer of display screens. The installer can use a pair of vertically disposed wall brackets, such as a single upper wall bracket and a single lower wall bracket, to accommodate most displays. But in the situation where the display is too wide for the single upper and single lower wall bracket, the installer can easily affix another wall bracket to widen the support for the bracket or space another bracket horizontally apart to create suitable support.

Methods of Attaching a Display Panel Using Pairs of Horizontally (or Laterally) Placed Mounting Plates (Wall Brackets)

A method for attaching a substantially flat television and/or computer display panel to a mounting surface comprises several steps. In one embodiment of this method, the installer does not affix the horizontally placed mounting panels to each other. The panels are separate from each other and at the same level. The steps include: an installer provides first, second, third, and fourth mounting plate as described above. The installer selects a height for mounting the first and second plates on the mounting surface. The installer positions the first mounting plate laterally apart from the second mounting plate. The installer mounts the first and second mounting plates to the mounting surface. The installer positions the third mounting plates and fourth mounting plates below and generally parallel to the first and second mounting plates. The third and fourth mounting plates are laterally spaced apart from each other, and in the same plane. The installer mounts the third and fourth mounting plate to the mount surface.

The installer provides a first support brace, according to the invention, having a first hook arm having first and second ends, wherein the first hook arm is pivotally attached to said first support brace at the first end, and the second end comprising a hook configured to engage with the supporting rod of the first mounting plate according to the invention. The installer mates the holes on the first support brace with the corresponding holes on the display panel, and affixes the first support brace to the mated holes on the display panel.

The installer provides a second support brace according to invention having a second hook arm having first and second ends, wherein the second hook arm is pivotally attached to the second support brace at the first end, and the second end comprising a hook configured to engage with the supporting rod of the second mounting plate. The installer mates the holes on the second support brace with the corresponding holes on the display panel, and affixes the second support brace to the mated holes on the display panel. Lastly, the installer slides the display panel downwardly until its weight is supported by engaging the hook arms with the supporting rods of the first and second mounting plates and engaging the receiver hooks with the supporting rods of the third and fourth mounting plates; and wherein said hooks and said rods substantially facilitating a horizontal positioning of said display panel by enabling the respective hooks to be laterally shifted over said supporting rods locating said display panel in the desired horizontal position.

In another embodiment of the method, the installer affixes each pair of the horizontally placed mounting plates at some point so that the panels combine to a form a longer mounting plate. For example, the installer can affix the pair of upper mounting plates together, first and second mounting plates, before affixing to the mounting surface. Or the installer can securely affix one of the pair to the mounting surface, and then affix the other one to the wall or end of the first mounting plate so long as the elongated mounting plate is formed and securely affixed to the mounting surface. The remaining steps of this method are same as the first embodiment of the method with the only exception being that the mounting plates are not separate or apart from each. The above two methods enable an installer to mount wider display screens having longer widths that cannot be accommodated by a single wall bracket (or mounting plate).

Hence, a wall bracket is provided that is simple and economical to manufacture, provides alternative mounting fastener options, and, in embodiments designed for mounting to a structural wall, offers flexibility in locating the fasteners to allow an installer to secure the wall bracket 30 to structural studs positioned according to applicable building codes.

In another embodiment, the wall bracket 30 may be extruded through an appropriately shaped die to result in a desired finished shape. For example, as an alternative to a rod welded to a wall bracket, a cross sectional shape for a wall bracket 30 may be extruded having an integral shelf, protrusion, or slot that performs the function of the rod 40 by being configured to securely receive a portion of a bracket affixed to a display panel either directly or indirectly, as will be discussed in more detail hereinafter. Subsequent to extrusion, the aforementioned mounting slots may be formed for receiving mounting fasteners therethrough.

Figure 3:
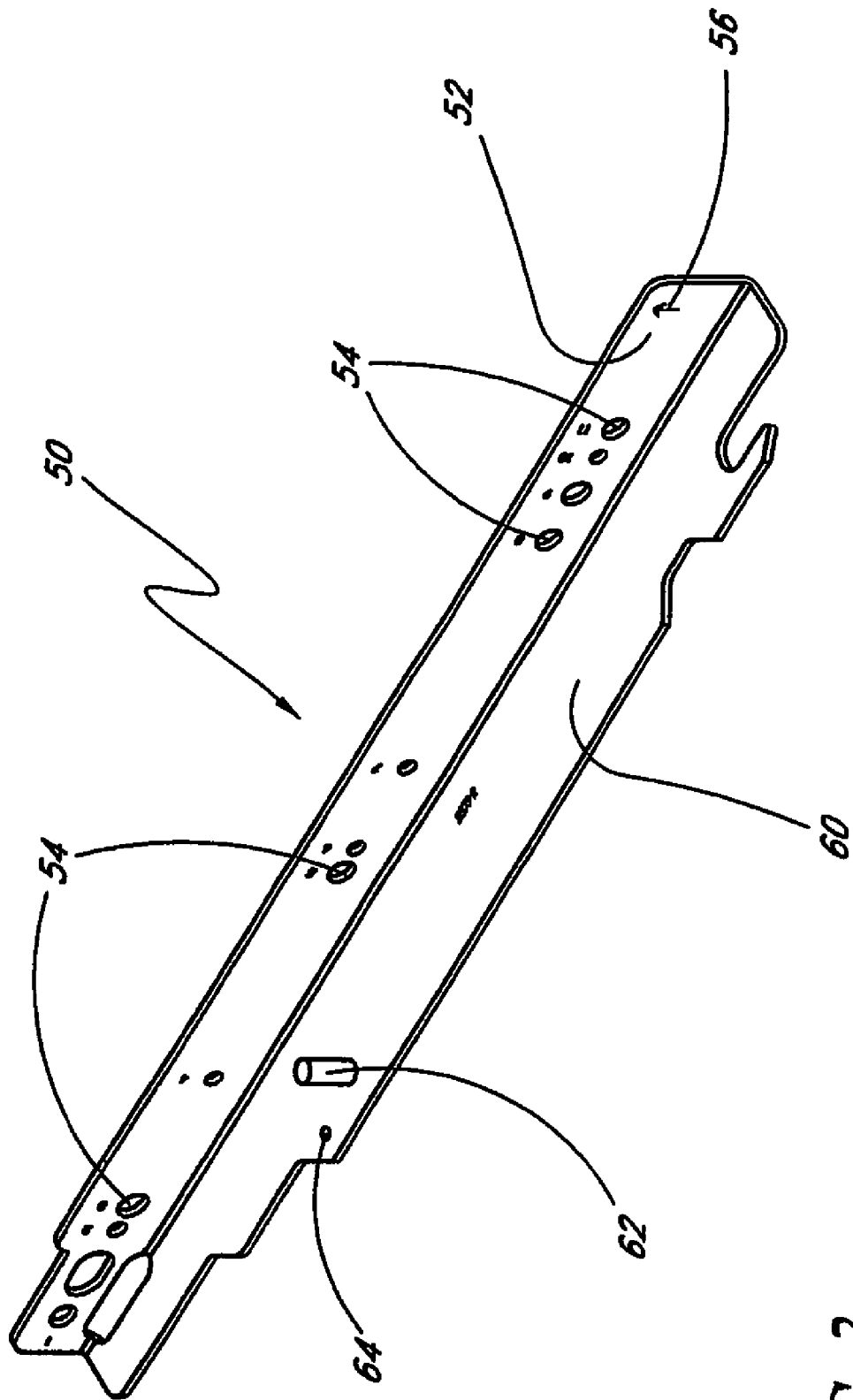
FIG. 3 illustrates an isometric view of one embodiment of a panel bracket for use in conjunction with the mounting device disclosed herein.
Figure 4:
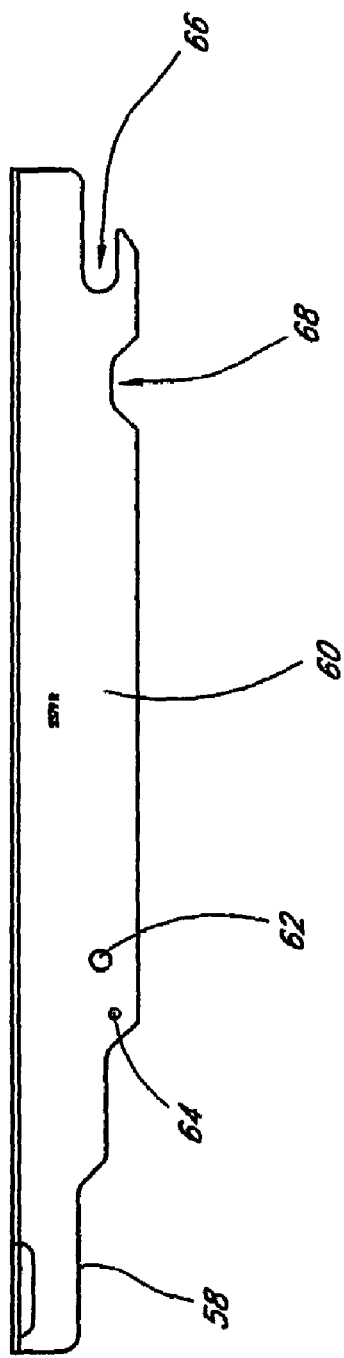
FIG. 4 illustrates a top plan view of the panel bracket shown in FIG. 3.
Figure 5:
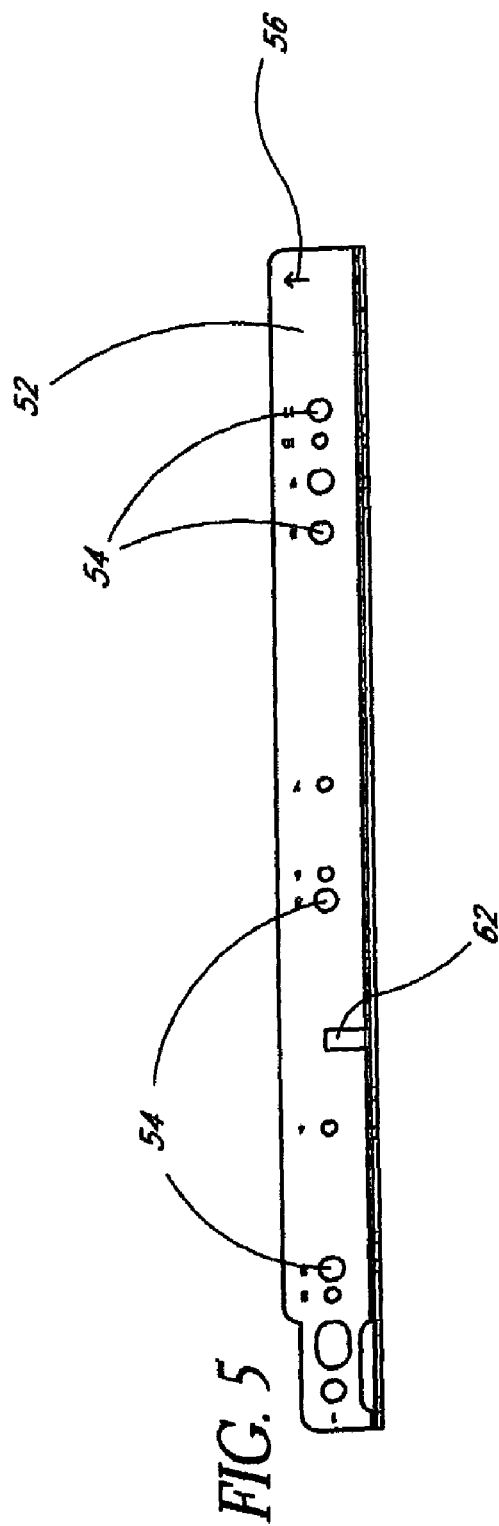
FIG. 5 illustrates a front elevational view of the panel bracket shown in FIG. 3 and depicting one possible mounting hole configuration.

FIG. 3 illustrates one embodiment of a display panel bracket 50 for use in conjunction with one embodiment of a flat panel display mount of the present invention. In conjunction with FIGS. 4-8, it is shown that the display panel bracket 50 is generally an L-shaped bracket in cross section. This enables a mounting leg 52 of the bracket to be secured to a display panel while the remaining installation leg 60 provides a mounting surface for a locking hook (not shown) and to further provide rigidity to the panel bracket 50. The mounting leg 52 is configured with a plurality of mounting holes 54 corresponding to various mounting hole patterns found on display panels. Each of the plurality of holes is optionally coded, such as with a number, to allow an installer to verify that equivalent holes are being utilized for the installation when more than one panel bracket 50 is used. Moreover, the coding allows printed directions to specify which holes should be used for a given display panel. Other indicia may be present, such as an arrow 56 showing the orientation of the panel bracket 50 during installation, or additional alignment cues.

Figure 6:
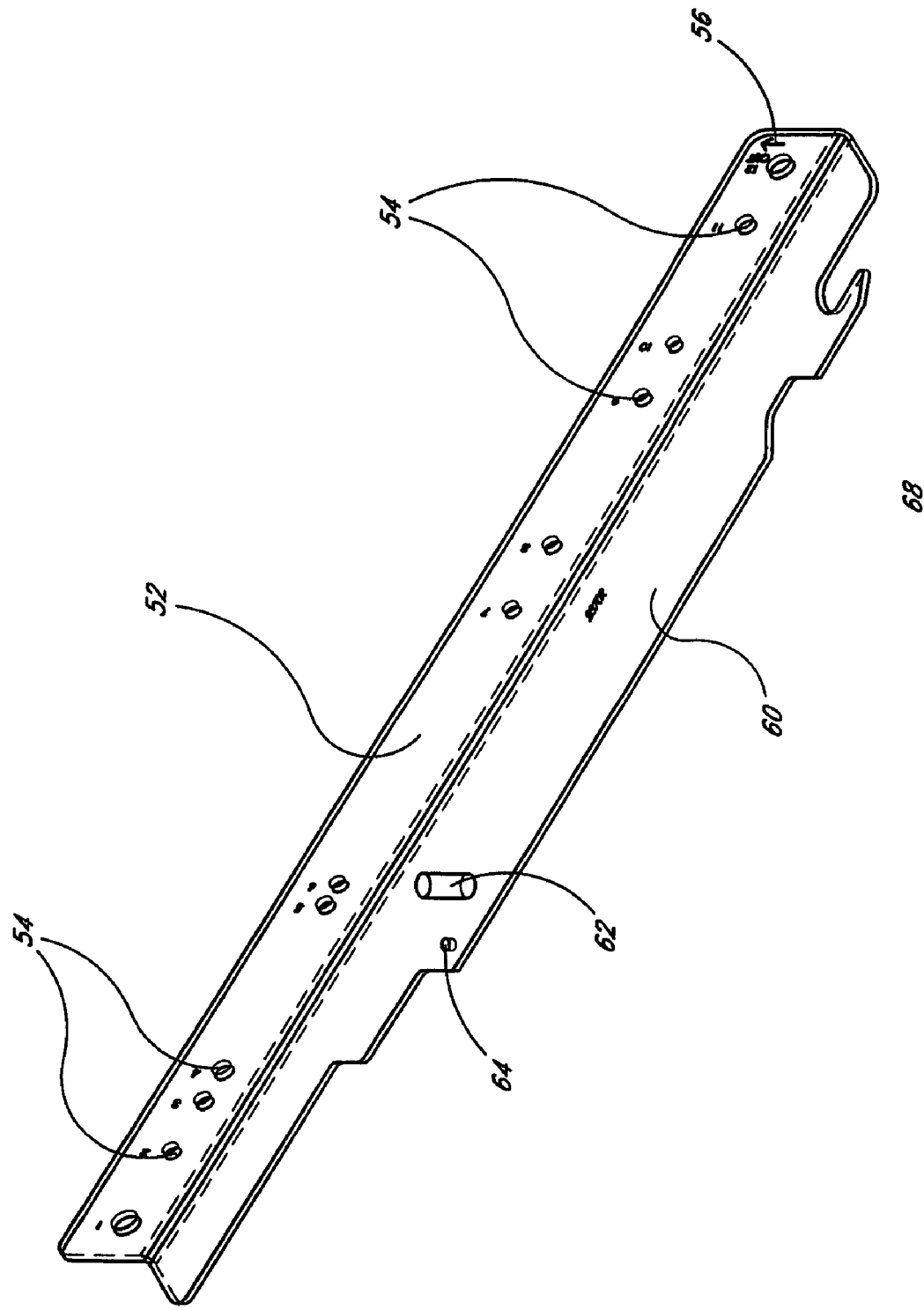
FIG. 6 is an isometric view illustrating an alternative embodiment of a display bracket according to the present invention.
Figure 7:
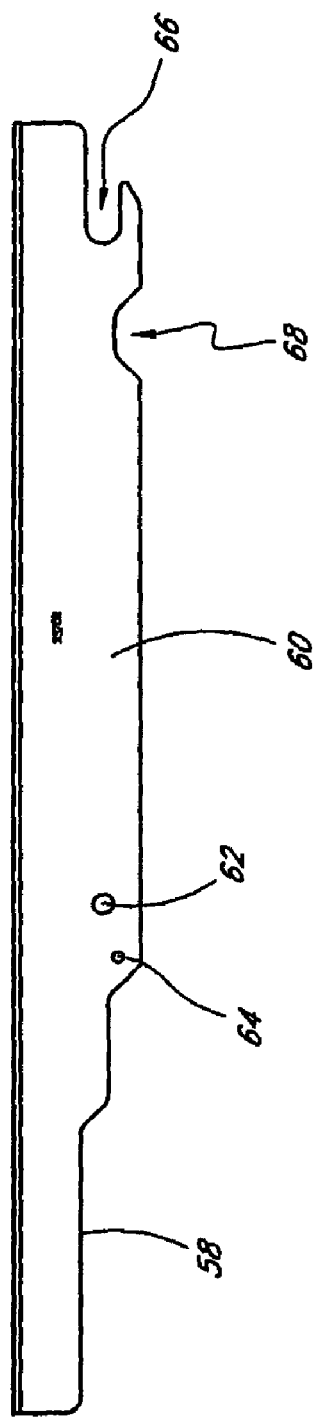
FIG. 7 illustrates a top plan view of the panel bracket of FIG. 6.
Figure 8:
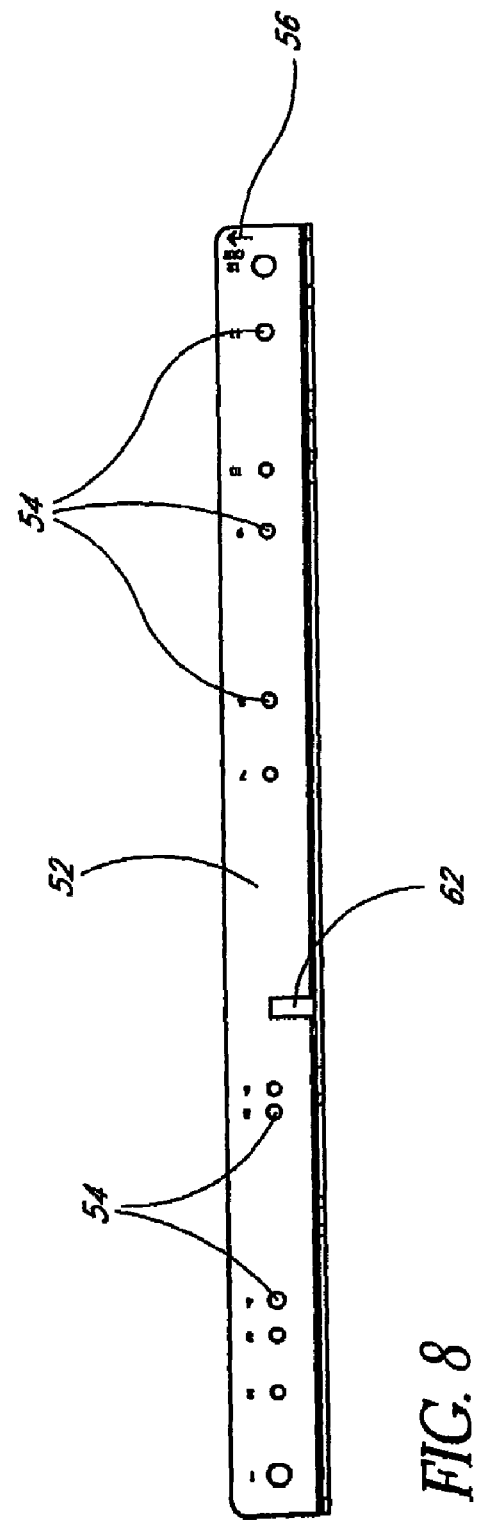
FIG. 8 is a front elevational view of the panel bracket shown in FIG. 6 showing an alternative mounting hole pattern.

The panel bracket 50 also includes an installation leg 60 configured with a boss 62 for receiving a locking hook (not shown) and a hole 64 for receiving a fastener. for increasing the friction between the locking hook and installation leg 60. The installation leg 60 further has a concave recess or receiving hook 66 configured to receive a mounting rod 40 that is attached to a wall bracket 30. The assembly will be described in later detail in relation to FIG. 10. There is a notch 68 formed in the lower portion of the installation leg 60 and a recess 58 formed in the upper portion of the installation leg 60 to provide a clearance for assembling the panel bracket 50 to the wall brackets 30. It should be obvious that the mounting hole 54 locations could be relocated to accompany a variety of display panels. Accordingly, it is preferable that a plurality of mounting holes 54 are provided on the mounting leg 60 of the panel bracket 50 such that a single panel bracket 50 is adaptable to a plurality of different display panels. Hence, FIGS. 6-8 illustrate an alternative mounting hole 54 configuration. It should further be obvious that the illustrated panel bracket shape is not the only embodiment that provides the functional characteristics of practicing the claimed invention, and should therefore, not be construed as limiting, but rather, as illustrative only.

The panel bracket 50 may be formed of any suitable material, such as sheet metal, plastics, or composites. In one embodiment, the panel bracket is stamped from a single piece of sheet metal, and then folded to form the appropriate L-shaped cross section. Either before or after folding, the boss 62 may be attached in a suitable manner.

Hence, a panel bracket is provided that has the benefits of being adaptable to a wide variety of different display panels, is economical to manufacture, and has the strength characteristics necessary to securely support a display panel mounted thereto.

Figure 9:
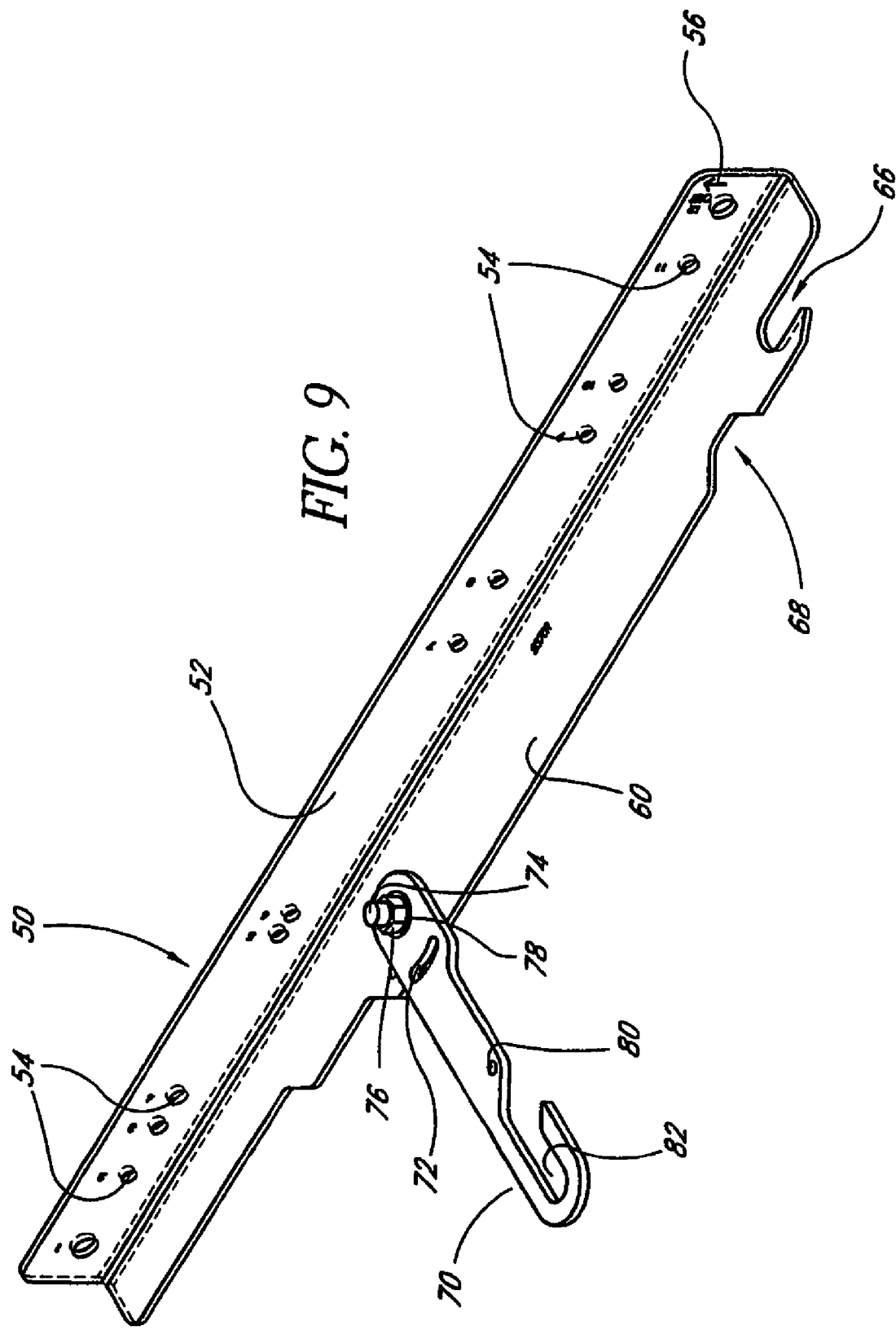
FIG. 9 illustrates an isometric view showing one embodiment of a display bracket having a pivotally attached locking arm.

FIG. 9 illustrates a panel bracket 50 having a locking hook 70 pivotally mounted thereto. As described above, the panel bracket 50 has a boss 62 formed thereon and preferably is threaded along at least a portion thereof for receiving a washer 78 and nut 76 to pivotally attach the locking hook 70 to the panel bracket 50. There may optionally be a lock washer 78 disposed between the nut 76 and the locking hook 70 to provide an adjustable tension on the bolt 74 to allow an installer to increase or decrease the frictional contact between the locking hook 70 and the panel bracket 50. Preferably, a fastener, such as a bolt, passes through arced groove 72 and threads into a threaded hole 84 formed in the installation leg 60. One or more washers, preferably formed of nylon, flank the locking hook 70 to provide a reduced coefficient of friction between the locking hook 70 and panel bracket 50 to allow the locking hook 70 to pivot about attachment boss 62. The force required to effect pivotal adjustment may be directly varied by the torque applied to the fastener that slidably rides within arced groove 72 formed within the locking hook 70. Other fastener types, such as rivets, are possible.

However, the described attachment is preferable because of the variable friction as will be discussed in later detail.

The locking hook 70 further includes a threaded hole 80 for receiving a lock knob (100 of FIG. 12) and will be discussed in greater detail hereinafter. The locking hook 70 terminates in a hook portion 82 configured to engage the rod 40 of the wall bracket 30 to provide hanging support to the panel bracket.

In an alternative embodiment, a panel bracket 50 may be configured with a locking hook that terminates in an alternative configuration corresponding to different embodiments of the wall bracket 30. For example, as discussed above, the wall bracket may be fanned to have a protrusion or slot horizontally attached to the wall for receiving a portion of the panel bracket. In an embodiment in which the wall bracket has a receiving slot, the hook portion may be omitted and the locking hook may terminate in a structure that cooperates with the dimensions of the receiving slot to allow a secure coupling of the components. For example, the receiving slot may be fanned to have a T-shaped cross section, and the hook portion may end in an insert that is substantially T-shaped for tracking within the T-shaped receiving groove of the wall bracket. The groove and insert may optionally be shaped in a dove-tail configuration, may be substantially C-shaped, or any other of a wide variety of shapes that provide a slot having an undercut portion to securely receive a cooperating structure configured to track within the shaped groove. Of course, the cooperating structures may be located on opposite brackets. For example, the insert may be located on the wall bracket 30 while the groove may be located on the locking hook. A number of alternative securing methods that provide for subsequent lateral adjustment are possible as will be apparent to those of skill in the art.

Figure 10:
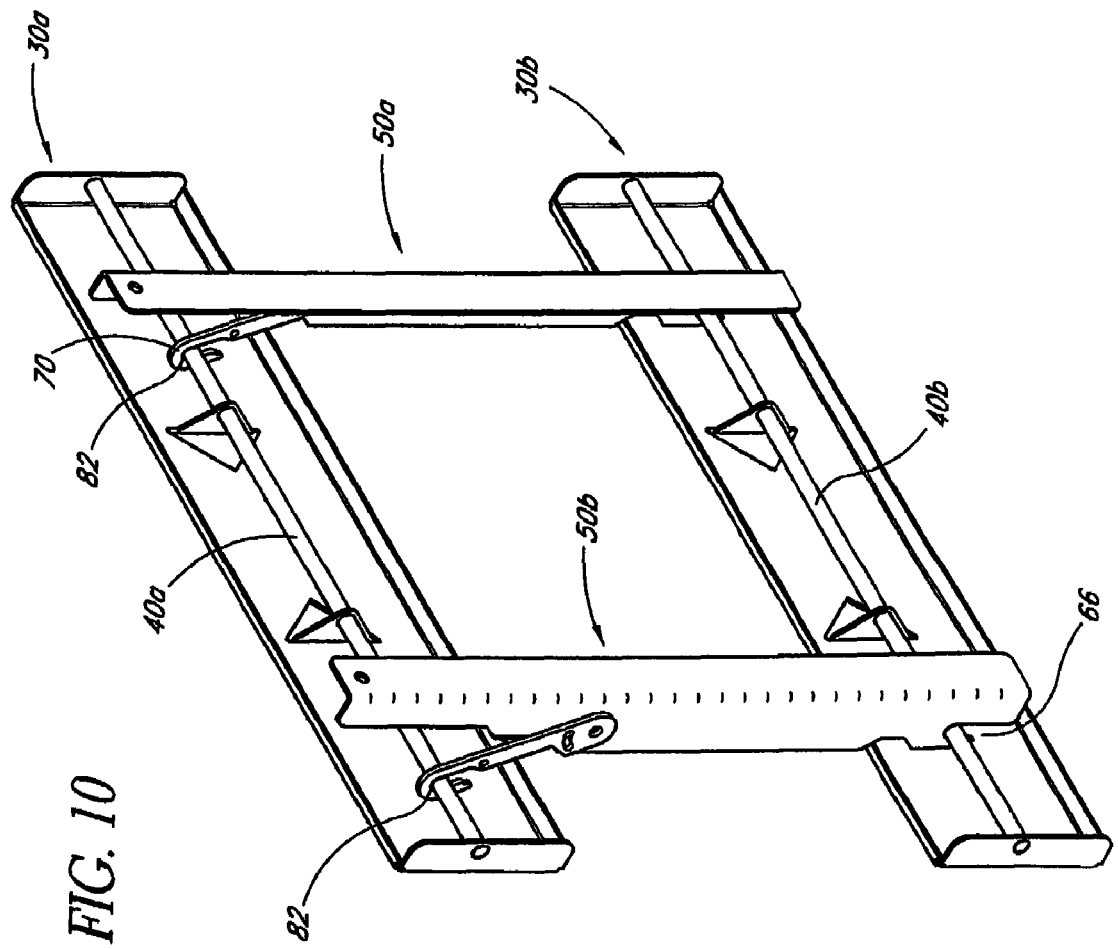
FIG. 10 illustrates one embodiment of an assembled display mount showing the interrelation of the various components.

Turning now to FIG. 10, the components are shown in a wall mounted configuration absent a display panel. It can be seen how the receiving hooks 66 and locking hooks 70 engage with the first and second rods 40a, 40b of the wall brackets 30a, 30b to provide the necessary support to an installed display panel. During installation, a first wall bracket 30a is mounted to a wall, preferably directly to the structural studs supporting the wall. A second wall bracket 30b is then positioned and mounted at a predetermined vertical location relative to the first wall bracket 30a. The predetermined spacing allows a panel bracket 50a, 50b to easily and securely fit between the first and second wall brackets 30a, 30b. The wall brackets may optionally be adjusted laterally before tightening their respective fasteners.

A first panel bracket 50 is affixed to a display panel 90, such as with machine screws, so that the locking hook 70 is toward the top of the display panel. A second panel bracket 50b may be affixed to the display panel 90 spaced a lateral distance from the first panel bracket 50a. The lateral spacing is usually dictated by the respective mounting hole pattern on the back of the display panel provided by the manufacturer thereof. Once the panel brackets 50a, 50b are secured to the display panel 90, the entire display panel with attached panel brackets 50a, 50b is lifted until the hook portions 72 of the locking hooks 70 are above the first rod 40a and the receiving hooks 66 are above the second rod 40b. At this time, the display panel with attached panel brackets 30a, 30b is positioned such that the panel brackets contact the wall brackets. To effectuate the mounting, the panel installer simply slides the brackets 50 down the rods 40a, 40b of the wall brackets 30a, 30b, until the locking hooks 70 engage the first rod 40a, and the receiving hooks 66 engage the second rod 40b. Thus, it is not necessary to painstakingly align the components and the mounting is easily accomplished. Moreover, the installer need not manually support the weight of the display panel while trying to align brackets, fumble with screws, or drive fasteners.

It can be appreciated that a stable support for a display panel is provided because the wall brackets support the panel brackets at four distinct locations—at each one of the receiving hooks 66 and locking hooks 70. Thus, there is no tendency for the display panel to wobble for lack of support. Furthermore, the entire installation is simplified and can be carried out by a single installer.

Referring again to FIG. 1, the flat screen display panel 90 has a front surface generally consisting of a frame 92 and a screen 94, and a back surface including a plurality of mounting holes 96. As discussed above, the panel brackets 50 preferably include a plurality of mounting hole configurations to allow a single panel bracket 50 to mount onto a wide variety of display panels 90. It should be apparent to one of ordinary skill that the display panel could optionally be mounted in a portrait orientation in addition to the landscape orientation illustrated.

Once the display panel is vertically mounted, lateral adjustment of panel 90 is very simply accomplished by sliding the panel brackets along the wall bracket rods 40. Specifically, each locking hook and each receiving hook can be slid in either direction laterally along the rod 40. Thus, the panel display is laterally adjustable to the extent that the locking hooks 70 and receiving hooks 66 can slide unimpeded along the wall bracket rods. Further lateral adjustment is impeded by the outer flanges 34 and the rod supports 42 on the wall bracket 30. In some embodiments, only a short, e.g., one inch lateral adjustment is provided whereas in other embodiments, a considerably longer adjustment, e.g., 12 inches of lateral adjustment is provided. It should be noted that once the display panel is mounted, the display panel mount is substantially hidden from view, thus resulting in a clean appearance.

Referring to FIGS. 11 and 12, a vertically pivoting adjustment range, or pitch adjustment, is illustrated. Because the locking hooks 70 are pivotally connected to the panel brackets 50, the upper section of the panel mounts 50 can pivot away from the first wall bracket 30a. The receiving hook 66 remains in engaged contact with the lower rod 40b and provides a fulcrum about which the panel brackets pivot. The locking hook 70 pivots about its attachment point 62 and thus allows the upper portion of the display panel to be displaced away from the upper wall bracket 30a. It should be noted that, when the locking hook 70 is parallel to the panel bracket 50, the arc center of the hook portion 82 and the axis of the upper rod 40a about which the hook is engaged are not coincident. Hence, in the orientation depicted in FIG. 11, the upper rod 40a provides almost no support to the weight of the display panel, and the majority of the display panel's weight is carried by the lower wall bracket 30b supporting the receiving hook 66. FIG. 11 shows that the arc center of the hook portion 82 is substantially above the axis of the upper rod 40a. This characteristic allows the panel bracket to pivot respective to the locking hook 70. However, this configuration also presents limits to the pivotal adjustment.

As shown in FIG. 12, the maximum downward pivot angle a. is achieved when either the hook portion 82 of locking hook 70 engages the upper rod 40a, or the screw 86 reaches the end of the arced slot 72 in which it is traveling. In either case, it is anticipated that the maximum downward pivot angle a is within the range of from about 8 degrees to about 15 degrees, and in one embodiment, is about 10 degrees.

As illustrated in FIG. 11, the minimum pivot angle is achieved when either the panel bracket 50 contacts the upper wall bracket 30a, or the screw 86 reaches the end of the arced slot 72 in which it is traveling. In either case, it is anticipated that the minimum pivot angle is about parallel with the surface the display panel is mounted to, which in most circumstances, will be substantially vertical. However, it should be obvious that the minimum angle could be greater or less than vertical.

The locking hook 70 is pivotally attached at 62 and a cooperating friction increasing connection allows the force required to pivot the locking hook 70 to be adjusted. A bolt or screw 86 passes through the arced groove 72 and threads into a hole formed in the panel bracket 50. There are optionally one or more washers 88 that provide a reduced frictional contact between the locking hook and panel bracket. This allows an installer to loosen the attachment and thus lower the required force to pivot the mounted display panel. The attachment may be subsequently tightened to maintain the display panel in a desired orientation. Alternatively, the pivotal attachment 62 may be tightened sufficiently to maintain the display panel in a desired orientation, yet still permit subsequent pivotal adjustment if a thresh hold force overcomes the frictional resistance.

It can be seen how the wall bracket 30 and panel bracket 50 cooperate to result in a low profile mount that allows the flat panel display to rest close to the mounting surface. The distance from the display panel to the wall is generally within the range of from about ~ inches to about 3 inches, and is preferably within the range of from about 1 inch to about 2 inches, and in one embodiment, is 1⅝ inches.

Once the panel brackets 50 engage the wall brackets 30, a locking knob 100 may be threaded into the threaded hole 80 formed in the locking hook 70 to prevent subsequent unintentional dismounting of the panel brackets 50 from the wall brackets 30. The locking knob 100, once installed, interferes with removal of the hook 82 from the upper rod 40a. In other words, the distance D1 between the periphery of the locking knob 100 and the extremity 102 of the hook portion 82 is less than the diameter of the upper wall bracket rod 40a such that the hook portion 82 is inhibited from being disengaged with the rod 40a.

Figure 13:
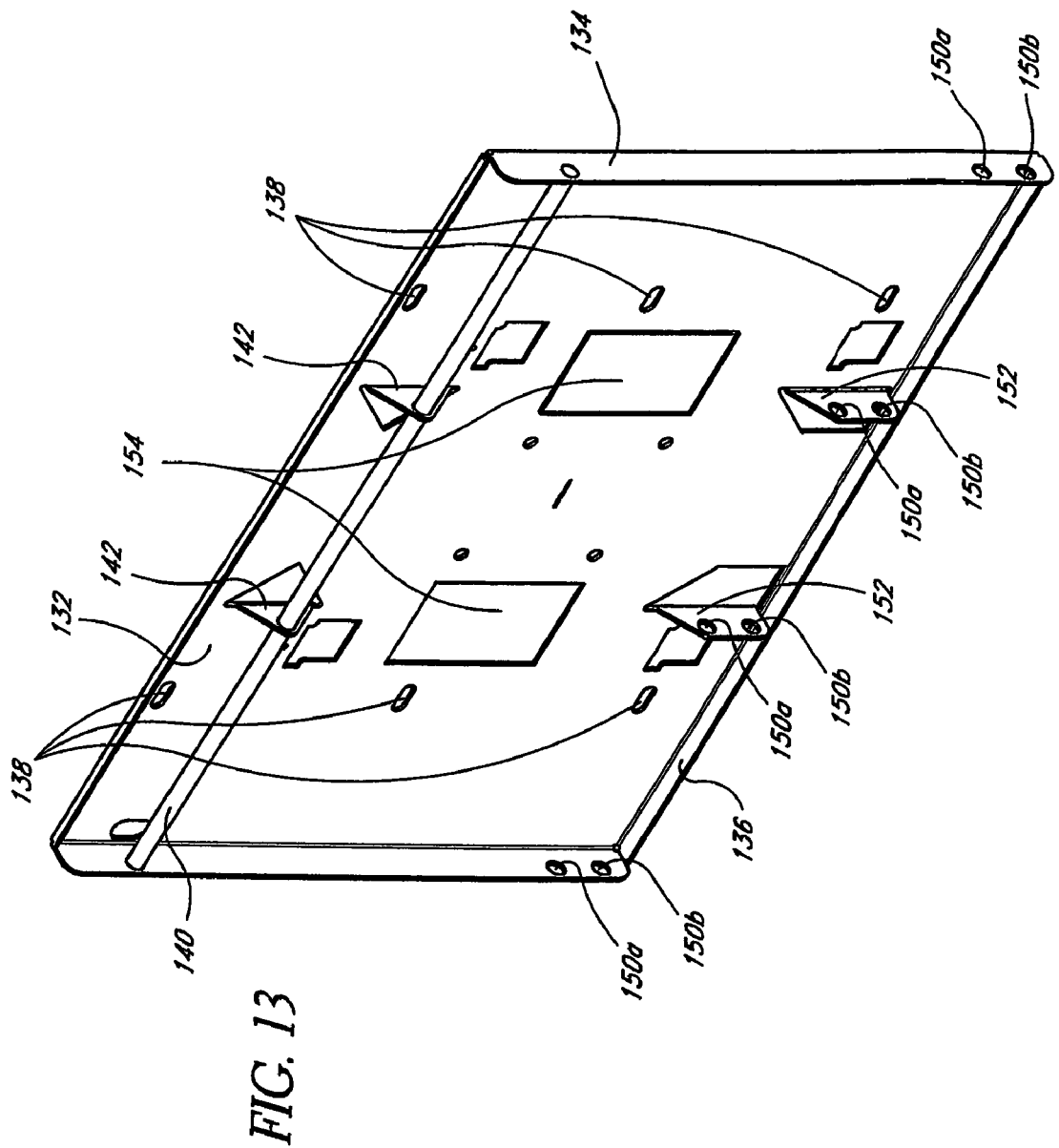
FIG. 13 illustrates an alternative embodiment of a wall bracket.

FIG. 13 illustrates an alternative embodiment of a wall bracket that allows a single wall bracket 130 to receive panel brackets (not shown) having a configuration similar to the panel bracket illustrated in FIG. 3. The wall bracket 130 is formed as described herein and includes a mounting rod 140 for receiving a hook portion of a panel bracket, and further includes coaxial mounting holes 150a and alternative coaxial mounting holes 150b for holding a second mounting rod (not shown) positioned to engage with a receiving hook of a panel bracket. Mounting holes 150a and 150b are formed through the lateral edges 134, and lanced out tabs 152 that are either bent from or attached to, mounting. surface 132. The alternate locations for the lower mounting rod allow a single wall bracket 130 to mate with different sized panel brackets. The panel brackets are generally sized in relation to a display panel, with a larger panel requiring longer panel brackets to provide adequate mounting support. The selective location of the lower mounting rod simply allows a single wall bracket to accommodate various sized panel brackets.

Wall bracket 130 has mounting holes 138 formed therein for mounting the wall bracket 130 to a wall or other support structure. As described herein, the mounting holes 138 are preferably configured as grooves to allow variable placement of mounting hardware to cooperate with the underlying structure of the wall the bracket 130 is being secured to. The illustrated mounting hole locations and pattern are illustrative, as the mounting holes could be configured on 16 inch centers, 24 inch centers, or both. Additional patterns and number of holes are contemplated herein.

Wall bracket 130 may further include voids 154 removed from mounting surface 132, such as for weight reduction or to provide access to wall jacks. Mounting surface 132 may include additional voids configured to reduce weight, reduce cost, or enhance aesthetics.

Figure 14:
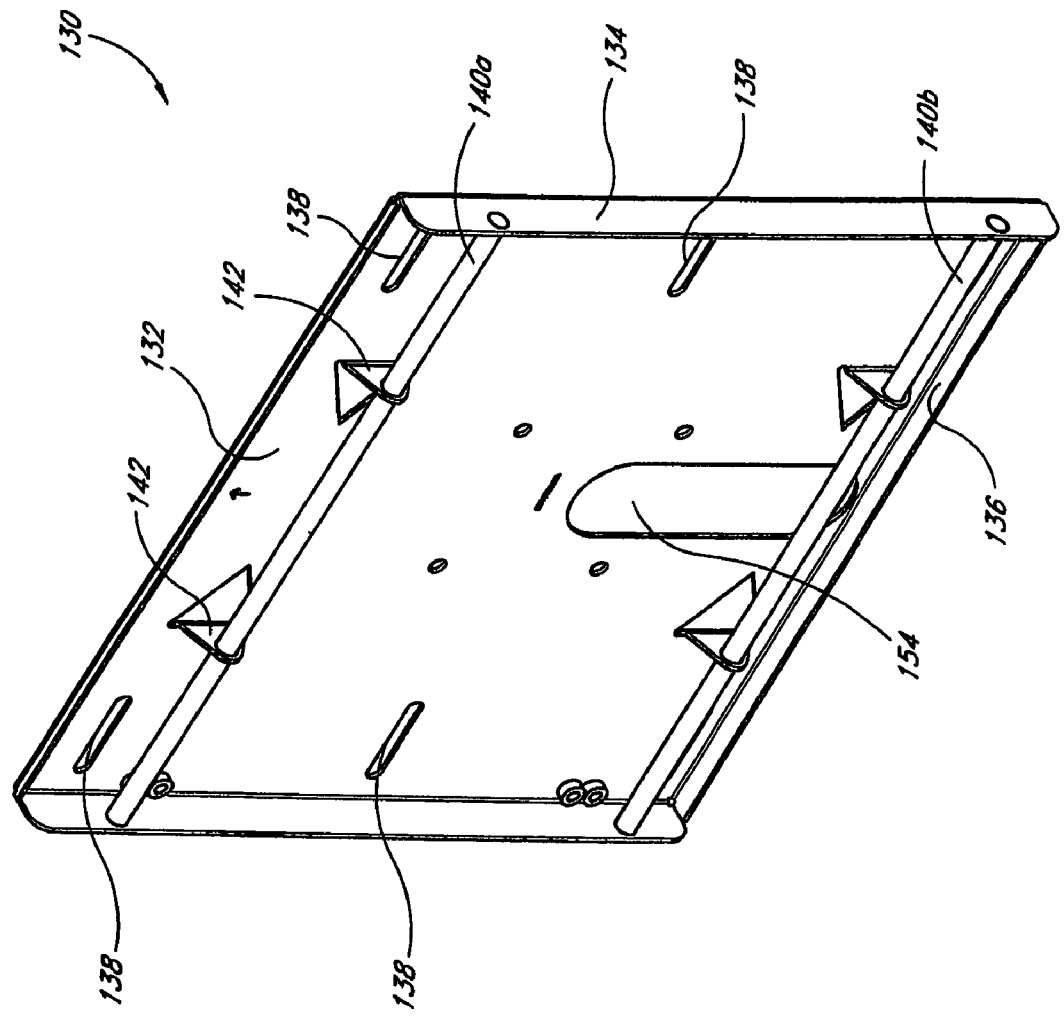
FIG. 14 illustrates yet another embodiment of a wall bracket.

FIG. 14 illustrates yet another alternative embodiment of a single wall bracket 130. In this embodiment, wall bracket 130 is configured with dual mounting rods 140a, 104b located a fixed distance apart corresponding to one embodiment of a panel bracket locking hook and receiving hook. The mounting rods 140a, 140b are secured to the wall bracket 130 by lanced out tabs as previously described.

A plurality of mounting grooves 138 are preferably formed through the mounting surface 132 and sized and configured to allow selective placement of mounting fasteners. A central void 154 may be provided to reduce weight and to allow access to wall jacks, such as for connections for electrical, display signals, amplifiers, audio cables, telephone connections, and the like.

Wall bracket 130 may be formed of any suitable material as previously described, but in one embodiment is preferably formed of substantially a single piece of sheet metal that has been stamped or otherwise worked to provide a suitable profile and having the desired cutouts and voids. Lateral edges 134 are bent to be generally perpendicular to mounting surface 132 and may optionally be welded to bent lower edge 136 to provide increased rigidity. Mounting rods 140a, 140b are inserted and welded or otherwise secured to the lateral edges 134 and flanges 142. The final assembly may optionally be deburred, sanded, painted, buffed, and/or polished.

Accordingly, the foregoing description describes a mounting bracket and method of manufacturing and installing that results is a solid mounting structure manufactured economically that can be quickly installed by a single installer while offering subsequent lateral and pivotal adjustment to result in an optimum viewing orientation.

All features disclosed in the specification, including the claims, abstract, and drawings, and all the steps of any method or process disclosed, may be combined in any combination, except combinations where at least some of such features and/or steps are mutually exclusive. Each of the features disclosed in the specification, including the claims, abstract, and drawings, can be replaced alternative features serving the same, equivalent, or similar purposes, unless expressly stated otherwise. Thus, unless expressly stated otherwise, each feature disclosed is one example of a generic series of equivalent or similar features.

While the foregoing description has been limited to specific preferred embodiments, it should be appreciated that variations therefrom are anticipated without departing from the full spirit and scope of the present invention. Thus, while the invention has been described herein with reference to certain preferred embodiments, these embodiments have been presented by way of example only, and not to limit the scope of the invention. Accordingly, other embodiments and changes in form and detail may be made therein by one skilled in the art without departing from the spirit and scope of the invention, including embodiments which do not provide all of the benefits and features set forth herein.

What is claimed is:

1. A low-profile mounting device for facilitating attaching a display panel to a mounting surface have horizontal slidability, comprising: a) a first mounting plate having a first support member, said plate being adapted to be securely affixed to said mounting surface, comprising a horizontally elongated member in which a surface is adapted to be contacted with said mounting surface; b) a second mounting member having a similar configuration to said first mounting member, and securely affixable a distance apart from said first mounting plate to said mounting surface; said second mounting plate having a second support member generally parallel to said first support member and spaced a distance therefrom, c) at least two vertically elongated brackets having been configured to be attachable to a display panel, d) a receiver hook configured to engage with said support member of said second mounting member; e) a hook arm having first and second ends, wherein said hook arm being pivotally attached to each of said brackets proximate said first end and said second end comprising a hook configured to engage with said support member of said first plate; whereby an installer needs only initially position the display panel near a desired location after which the panel is allowed to slide downwardly until its weight is supported by engagement of said hook arms with said first support member and by engagement of said receiver hooks with said second support member, and said hooks and said support members being capable of sliding horizontally to substantially facilitating a horizontal positioning of said display panel by enabling the respective hooks to be laterally shifted over said support members to locate said display panel in the desired horizontal position, and further comprising a friction increasing device coupled to said first and second hook arms and each respective support brace to maintain a pivotal degree therebetween.

2. The mounting device of claim 1 further including a stop tab and wherein the slidability of said brackets relative to said members is limited by the first bracket to encounter a stop tab when horizontally shifted.

3. The mounting device of claim 1 wherein said support members are rods and wherein said stop tabs support said rod a fixed distance from their respect mounting plates.

4. The mounting device of claim 1 wherein said brackets lie on either side of said stop tab.

5. The mounting device of claim 1 wherein said first and second mounting members are the same member.

6. The mounting device of claim 1 wherein said first and second mounting members are joined.

7. The mounting device of claim 1 wherein at least one support member is a slot in said mounting members and wherein said hook arm is configured to track within said slot.

8. The mounting device of claim 1 wherein said at least one hook arm includes a locking mechanism to prevent removal of said arm from said supporting member after installation.

9. A low-profile mounting device for facilitating attaching a display panel to a mounting surface have horizontal slidability, comprising: a) a first mounting plate having a first support member, said plate being adapted to be securely affixed to said mounting surface, comprising a horizontally elongated member in which a surface is adapted to be contacted with said mounting surface; b) a second mounting member having a similar configuration to said first mounting member, and securely affixable a distance apart from said first mounting plate to said mounting surfaces said second mounting plate having a second support member generally parallel to said first support member and spaced a distance therefrom, c) at least two vertically elongated brackets having been configured to be attachable to a display panel, d) a receiver hook configured to engage with said support member of said second mounting member; e) a hook arm having first and second ends, wherein said hook arm being pivotally attached to each of said brackets proximate said first end and said second end comprising a hook configured to engage with said support member of said first plate; whereby an installer needs only initially position the display panel near a desired location after which the panel is allowed to slide downwardly until its weight is supported by engagement of said hook arms with said first support member and by engagement of said receiver hooks with said second support member, and said hooks and said support members being capable of sliding horizontally to substantially facilitating a horizontal positioning of said display panel by enabling the respective hooks to be laterally shifted over said support members to locate said display panel in the desired horizontal position and, wherein at least one of said first and second hook arms have a threaded hole formed therein and said lock comprises a threaded knob configured to fit within said threaded hole thereby interfering with subsequent detachment of said hook arm from said support of said first member, and further comprising a lock apparatus to lock said first and second hook arms onto said support member of said first plate.

* * * * *